United States Patent
Mack et al.

(10) Patent No.: US 6,396,844 B1
(45) Date of Patent: May 28, 2002

(54) BACKPLANE ARCHITECTURE FOR PROVIDING BOTH LOOP REPEATER AND MULTIPLEXED MODE CONNECTIVITY IN THE SAME EQUIPMENT SHELF

(75) Inventors: David L. Mack, Madison; David R. Krueger, Huntsville; John B. Bartell, Madison, all of AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/169,610

(22) Filed: Oct. 9, 1998

(51) Int. Cl.$^7$ .......................... H04L 12/28; H04L 12/56

(52) U.S. Cl. .................... 370/420; 370/352; 370/537

(58) Field of Search ................. 370/419, 420, 370/421, 422, 423, 424, 352, 353, 354, 355, 356, 499, 537, 538, 539, 540, 541

(56) References Cited

U.S. PATENT DOCUMENTS

| | | | | |
|---|---|---|---|---|
| 4,811,333 A | * | 3/1989 | Rees ........................... | 370/217 |
| 5,311,576 A | * | 5/1994 | Brunson et al. ......... | 379/88.26 |
| 5,331,632 A | * | 7/1994 | Aaron et al. ................ | 370/376 |
| 5,623,489 A | * | 4/1997 | Cotton et al. ............... | 370/381 |
| 6,069,878 A | * | 5/2000 | Christensen ................ | 370/263 |

* cited by examiner

Primary Examiner—David R. Vincent
Assistant Examiner—Bob A. Phunkulh
(74) Attorney, Agent, or Firm—Allen, Dyer, Doppelt Mlibrath & Gilchrist, P.A.

(57) ABSTRACT

To provide either or both multiplexed and non-multiplexed (loop repeater) mode communications in the same equipment shelf between a network and plural subscriber circuits, a multi-mode backplane architecture includes a network interface multiplexer that provides time division multiplexed signal connectivity and point-to-point multiplexed signal connectivity between the network and line circuit access modules, to which the subscriber circuits are selectively ported. Each of a plurality of non-multiplexed interface connectors is configured for external connection to non-multiplexed communication links of the network and non-multiplexed communication links of the subscriber circuits. A plurality of access module card slots receive line circuit access modules that are individually programmable to provide a selected one of a plurality of diverse modes of telecommunication connectivity between the network and a subscriber circuit. The line circuit access modules have input/output multiplexers that selectively provide connectivity between its signal processor line and signal paths of the network interface multiplexer, and signal paths of a plurality of point-to-point communication ports of non-multiplexed interface connectors.

15 Claims, 12 Drawing Sheets

US 6,396,844 B1

BACKPLANE ARCHITECTURE FOR PROVIDING BOTH LOOP REPEATER AND MULTIPLEXED MODE CONNECTIVITY IN THE SAME EQUIPMENT SHELF

FIELD OF THE INVENTION

The present invention relates in general to telecommunication networks, and is particularly directed to a multi-mode backplane architecture, that is configured to support both multiplexed communication circuits and non-multiplexed (loop repeater) circuits in the same equipment shelf, and thereby provide either or both types of telecommunication connectivity between the network and subscriber circuits served by the network.

BACKGROUND OF THE INVENTION

Prior to the advent of multiplexed—digital communications, telephony service providers provided telecommunication connectivity to their subscribers by way of dedicated, point-to-point analog copper wire loops, extending from line cards installed in an equipment bank of a service, facility, such as a central office to telephone equipment installed at a customer site. With continuing improvements in digital communication equipment and transport protocols, these conventional point-to-point loops have been augmented by time division multiplexed (TDM) digital circuits, that are capable of transporting a wide variety of communication signals (audio/voice, video and data) to multiple customer premise equipments.

Because multiplexed digital circuits require a backplane architecture different than that employed for legacy loop circuit line card equipment racks, telecommunication service providers currently employ two respectively different types of line card equipment shelves—one for legacy loop circuits; the other for multiplexed circuits. Now even though it is anticipated that the number of multiplexed equipment installations will continue to grow, and may eventually become the predominant mode of network communication circuit, it is still necessary that each telecommunication equipment installation have the capability of providing service for both types of circuits. This means that each line circuit installation facility must be equipped with both multiplexed and loop repeater mode backplane shelves, irrespective of the degree to which each is populated, which increases both the complexity and cost of the installation.

SUMMARY OF THE INVENTION

In accordance with the present invention, the above problem is effectively obviated by a new and improved multi-mode backplane architecture, that is configured to simultaneously support and provide telecommunication connectivity for both multiplexed communication circuits and non-multiplexed (loop repeater) circuits in the same equipment shelf, so that both signalling modes are available in the same equipment shelf between the network and subscriber circuits connected to the backplane. For this purpose, the backplane architecture of the present invention comprises a set of redundant (for improved reliability) network interface multiplexers, each of which provides both time division multiplexing and point-to-point multiplexing connectivity between the network and line access modules to which subscriber circuits served by the network are selectively ported.

On the network side, each redundant network interface multiplexer is ported to a pair of high speed multiplexed network communication links that transport standard high speed multiplexed digital telecommunication signals, such as but not limited to DSX, STS-1, OC-X signals. On the line circuit side, each network interface multiplexer is coupled to a time division multiplexed communication bus, along which a plurality of line access module card slots are distributed, and to a plurality of point-to-point communication links, that are ported to respective ones of the line access module card slots.

Each network interface multiplexer contains a data buffer that is ported between each of the pair of high speed multiplexed network communication links and a signal path routing control processor. The routing control processor is coupled to a data matrix, that is ported to respective ones of the line access modules, and a time division multiplexed port, that is coupled to the time division multiplexed communication bus. The signal path routing control processor and the data matrix are controlled by a multiplexer control digital signal processor. Once provisioned by the system controller unit, the multiplexer control processor is operative to control the execution of the intended multiplexed telecommunication signalling functionality between the high speed multiplexed network communication links and the line access modules.

Each access module card slot is configured to receive a line circuit access module that is programmably configurable to provide a selected mode (multiplexed mode or loop repeater mode) of telecommunication connectivity between the network and a subscriber circuit served by the network. For external loop mode connectivity, a plurality of point-to-point communication links are respectively ported between external loop ports of the access module card slots and associated loop ports of a plurality of non-multiplexed interface connectors. Each non-multiplexed interface connector is configured for connection to non-multiplexed communication links of the network and non-multiplexed communication links (e.g., two-wire loops) of subscriber circuits served by the network.

A system controller unit, such as a desktop computer terminal, is coupled to each of the redundant network multiplexers and the line circuit access modules for allowing network service personnel to program backplane connectivity configuration parameters into the redundant network multiplexers and the line circuit access modules, and thereby enable any line access module to provide either multiplexed or loop repeater mode telecommunication connectivity between the network and subscriber circuit to which that line access module is ported.

In order to provide a selected mode of telecommunication connectivity, such as but not limited to ISDN, HDSL, ADSL, T1 office repeater, fractional T1, optical DS2, DSX-1, DDS, DAML, DAML POTS, etc., between the network and a subscriber circuit served by the network, a respective line circuit signal access module contains a processor controlled input/output multiplexer arrangement, that is buffered between each network interface multiplexer and respective sets of non-multiplexed communication links that are ported to the non-multiplexed interface connectors.

For this purpose, a multiplexed signal input buffer has a set of inputs ported to the TDM bus and point-to-point links from the network interface multiplexers, and a set of outputs ported to multiplexed inputs of an input multiplexer portion of the input/output multiplexer arrangement. On the non-multiplexed signalling side, a non-multiplexed signal input buffer has a set of non-multiplexed signal-associated inputs ported to point-to-point loops of the non-multiplexed interface connectors. On its output side, the non-multiplexed signal input buffer has a set of outputs ported to associated input ports of the input multiplexer portion of the input/output multiplexer arrangement. The input multiplexer has a plurality of outputs associated with respective ones of its multiplexed and non-multiplexed inputs coupled to corresponding inputs of a protocol conversion, network/subscriber circuit connectivity-defining, signal processing circuit.

The signal processing circuit is preferably implemented as a digital signal processor that is programmably configurable by the system controller unit to execute protocol conversion functionality for effecting one of loop repeater and time division multiplex connectivity between selected ones of its input and output ports, so as to provide a selected mode and type of telecommunication connectivity, such as those referenced above. The signal processing circuit has a plurality of output ports coupled to corresponding inputs of an output multiplexer portion of the input/output multiplexer.

On the multiplexed signal side, the line access module's output multiplexer has TDM output bus ports respectively coupled to TDM bus ports, and point-to-point output bus ports respectively coupled to associated inputs of the multiplexed signal input buffer. Likewise, on the non-multiplexed signal side, the output multiplexer has a set of non-multiplexed output ports coupled to respective non-multiplexed signal-associated input ports of the non-multiplexed signal input buffer. The mode of connectivity through and operation of the line access module's input/output multiplexer arrangement and its protocol conversion, network/subscriber circuit connectivity-defining, signal processing circuit is controlled by an access module control processor that is coupled to the backplane's system controller unit. Since each line access module is selectively connectable to and individually programmable for providing connectivity and protocol conversion for either multiplexed or loop mode signalling paths of both network and subscriber connections, the backplane enjoys complete flexibility in terms of types of circuit and mode of operation that may be emulated by each line access module.

DETAILED DESCRIPTION

Figure 1:
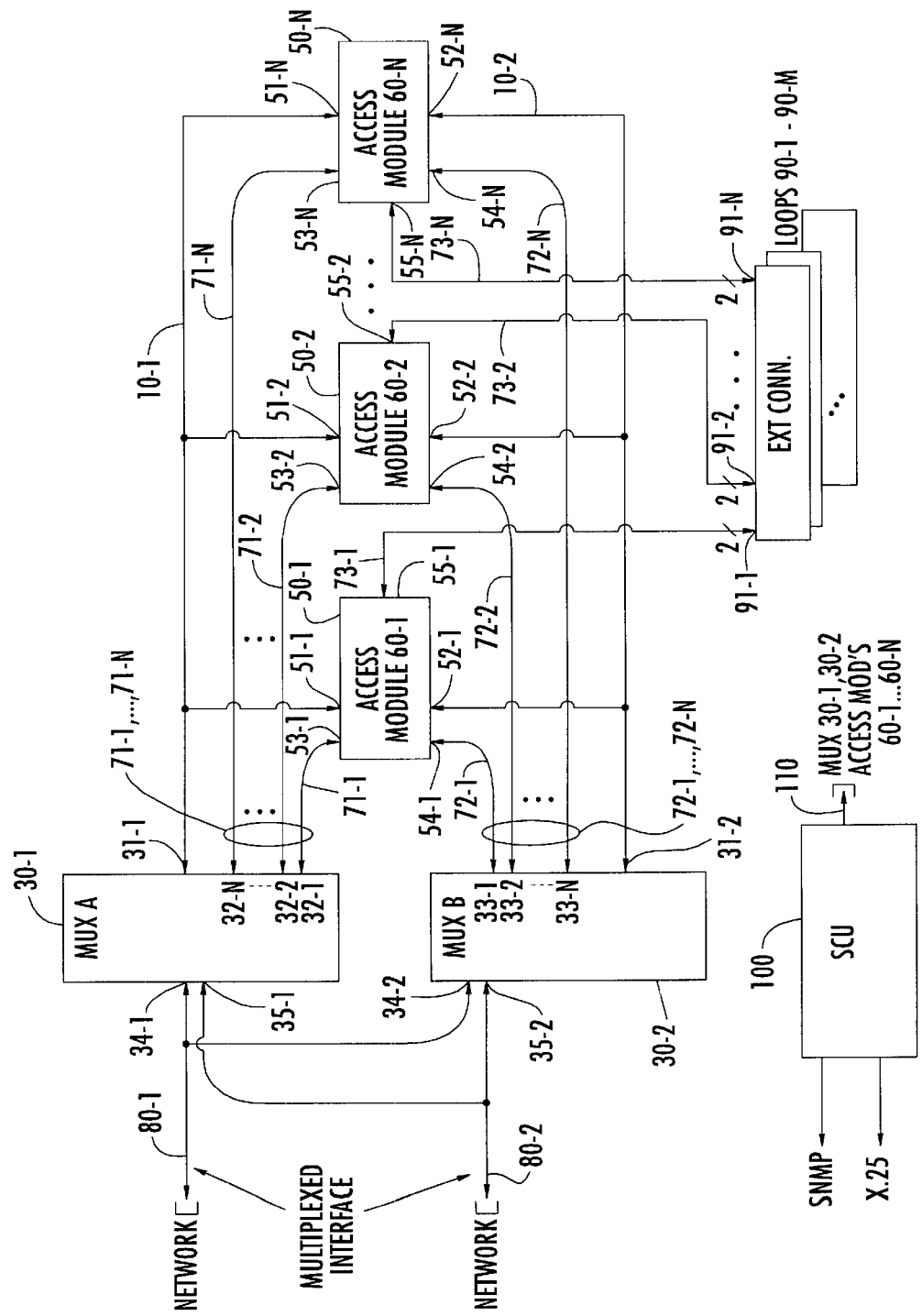
FIG. 1 diagrammatically illustrates the overall configuration of the multimode backplane architecture of the present invention.

Before describing in detail the multimode backplane architecture of the present invention, it should be observed that the invention resides primarily in what is effectively a prescribed arrangement of conventional multiplexed and non-multiplexed communication circuits and associated digital signal processing components and an attendant supervisory control program therefor, that controls the operations of such circuits and components. Consequently, the configuration of such circuits and components and the manner in which they are interfaced with other telecommunication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping and processing sequence, whereby the present invention may be more readily understood.

The overall configuration of the multimode backplane architecture of the present invention is diagrammatically illustrated in FIG. 1. For improved reliability, the backplane architecture is shown as having redundant multiplexer circuits, each of which provides both time division multiplexing and point-to-point multiplexing connectivity between the network and subscriber circuits. For this purpose, first and second multiconductor, time division multiplexed communication buses 10-1 and 10-2 are ported to respective multi-pin multiplexed backplane ports 31-1 and 31-2 of first and second network interface multiplexers 30-1 (MUX A) and (MUX B) 30-2. As will be described in detail below with reference to FIG. 2, these redundant network interface multiplexers 30-1 and 30-2 provide multiplexed connectivity between a pair of redundant high speed multiplexed network communication links 80-1 and 80-2, and a plurality of access module card slots 50-1, . . . , 50-N. High speed multiplexed network communication links 80-1 and 80-2 may transport standard high speed multiplexed digital telecommunication formatted signals, such as but not limited to DSX (e.g., DS3), STS-1, OC-1, OC-3, etc.). Time division multiplexed communication link 10-1 is coupled to TDM backplane ports 51-1, . . . , 51-N of access module card slots 50-N; time division multiplexed communication link 10-2 is coupled to TDM backplane ports 52-1, . . . , 52-N of access module card slots 50-1, . . . , 50-N.

The access module card slots 50-1, . . . , 50-N are configured to receive one or more line circuit access modules 60, N ones of which are respectively shown at 60-1, . . . 60-N. As will be described below with reference to the more detailed diagram of FIG. 3, a respective line circuit access module 60-i contains a signal processing circuit that is programmably configurable to provide telecommunication connectivity between the network and a subscriber circuit served by the network.

For point-to-point connectivity with the high speed network interface, the backplane architecture further includes a first plurality of N, multi-pin, point-to-point multiconductor communication links 71-1, 71-2, . . . , 71-N, that are respectively ported between ports 32-1, 32-1, . . . , 32-N of the first network interface multiplexer 30-1, and associated point-to-point multiplexer ports 53-1, 53-2, . . . , 53-N of the access module card slots 50-1, 50-2, . . . , 50-N. Similarly, for the redundant (second) network multiplexer 30-2, a plurality of N, multi-pin, point-to-point multiconductor communication links 72-1, . . . , 72-N are respectively ported between ports 33-1, . . . , 33-N of the second network interface multiplexer 30-2, and associated point-to-point multiplexer ports 54-1, . . . , 54-N of the access module card slots 50-1, . . . , 50-N.

On the network side, the network interface multiplexer 30-1 has a multiplexed network port 34-1 configured for connection to the high speed multiplexed network communication link 80-1, and a redundant network multiplexed network port 35-1 configured for connection to the redundant high speed multiplexed network communication link 80-2. Similarly, the network interface multiplexer 30-2 has a multiplexed network port 34-2 configured for connection to the high speed multiplexed network communication link 80-1, and a redundant network multiplexed network port 35-2 configured for connection to the high speed multiplexed network communication link 80-2.

For external loop connectivity, a third plurality of N multi (two)-pin, point-to-point (loop-associated) multiconductor communication links 73-1, ..., 73-N are respectively ported between external loop ports 55-1, ..., 55-N of the access module card slots 50-1, ..., 50-N, and associated loop ports 91-1, ..., 91-N of a plurality M of non-multiplexed, multipin interface connectors 90-1, ..., 90-M. Each non-multiplexed interface connector 90-i is configured for connection to non-multiplexed communication links of the network and non-multiplexed communication links (two-wire loops) of subscriber circuits served by the network.

FIG. 1 also shows a system controller unit (SCU), such as a desktop computer terminal 100 coupled with a network management protocol interface (e.g., an X.25 or SNMP interface), through which backplane connectivity configuration parameters are programmed by service provider administrative personnel into the network multiplexers 30-1 and 30-2, and the line circuit access modules 60. SCU 100 has an control bus 110, that is coupled to each of the network multiplexers 30-1 and 30-2, and the line circuit access modules 60, as will be described below with reference to FIGS. 2 and 3.

Figure 2:
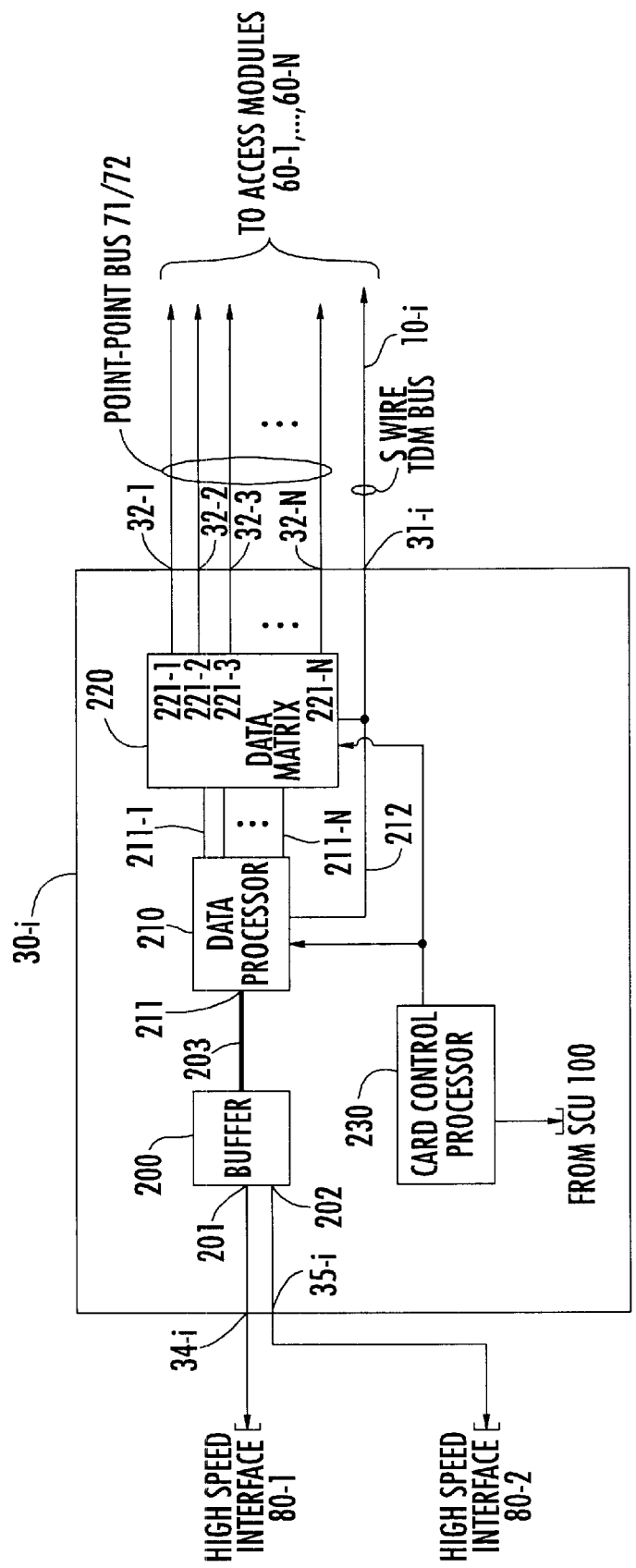
FIG. 2 diagrammatically illustrates the configuration of a respective network interface multiplexer of the backplane architecture of FIG. 1.

Referring now to FIG. 2, a respective one of the two network interface multiplexers 30-1 and 30-2 is diagrammatically shown as containing a data buffer 200 having ports 201 and 202, that are coupled to respective network connection ports 34-i and 35-i for high speed multiplexed network communication link 80-1, and port 35 for high speed multiplexed network communication link 80-2. The data buffer 200 is further coupled via a bus 203 to a multilink data port 211 of a signal path routing control data processor 210. Data processor 210 has a plurality of data links 211-1, ..., 211-N coupled to a data matrix 220, and a time division multiplexed link 212 coupled to data matrix 220 and to multi-pin multiplexed backplane port 31-i.

Data matrix 220 has a plurality of N ports 221-1, ..., 221-N coupled to the ports 32-1, ..., 32-N of the first network interface multiplexer 30-1. Each of the data processor 210 and the data matrix 220 are controlled by a multiplexer control digital signal processor (DSP) 230. Once provisioned by the system controller unit (SCU) 100, DSP 230 is operative to control the execution of the intended multiplexed telecommunication signalling functionality between the high speed multiplexed network communication links and the line circuit access modules.

Figure 3:
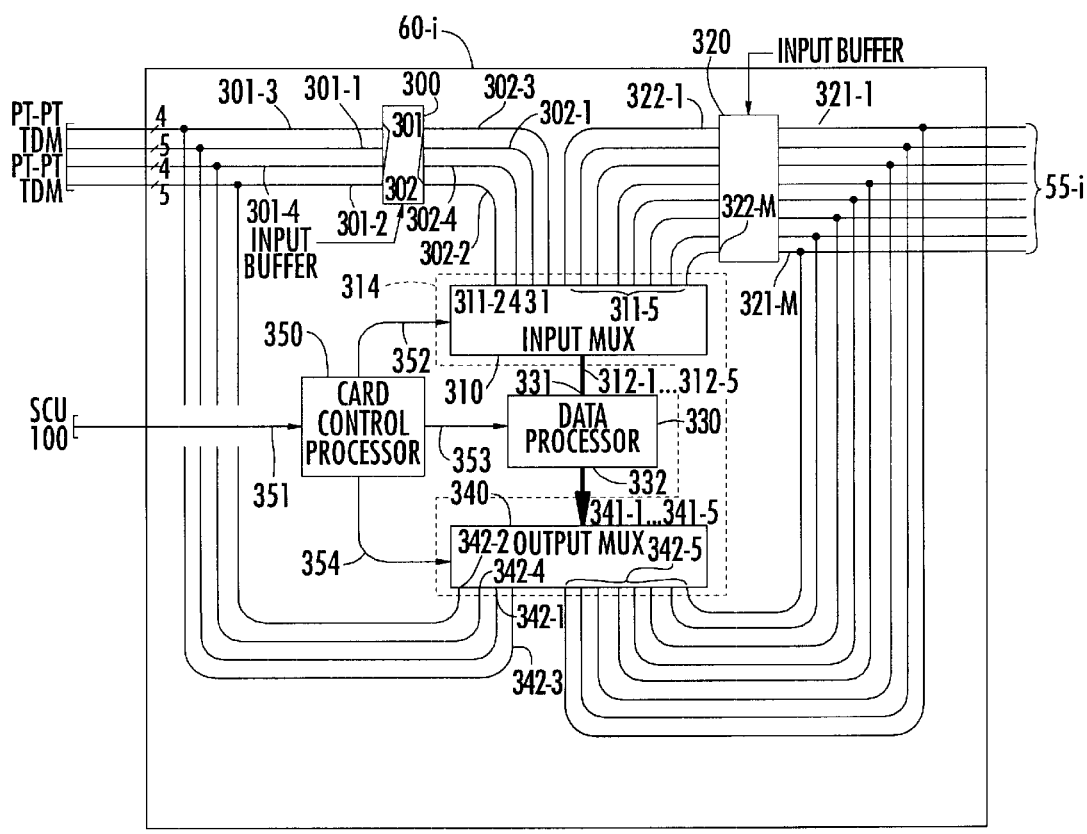
FIG. 3 diagrammatically illustrates the configuration of a respective line access module of the backplane architecture of FIG. 1.

The configuration of a respective access module 60-i is diagrammatically illustrated in FIG. 3 as comprising a multiplexed signal input buffer 300, having a set of multiplexer-associated input ports 301 coupled to the multiplexers 30-1 and 30-2, and a set of output ports 302 coupled to inputs 311 of an input multiplexer 310 of an input/output multiplexer 314. Input ports 301 include a first TDM bus port 301-1 coupled to a respective one of the access module card slot's TDM ports 51-1, ..., 51-N, and a redundant TDM bus port 301-2 coupled to a respective one of the redundant access module card slot's TDM ports 52-1, ..., 52-N. Input ports 301 further include a first point-to-point bus port 301-3 coupled to a respective one of the access module card slot's ports 53-1, ..., 53-N, and a redundant point-to-point multiplexed bus port 301-2 coupled to a respective one of the access module card slot's redundant ports 54-1, ..., 54-N. The input buffer's multiplexed output ports 302 include a first TDM bus port 302-1, and a redundant TDM bus port 302-2 coupled to associated first and second TDM bus ports 311-1 and 311-2 of input multiplexer 310. Input buffer output ports 302 also include a first and redundant point-to-point bus ports 302-3 and 302-4 coupled to associated third and fourth ports 311-3 and 311-4 of input multiplexer 310.

On the non-multiplexed signalling side, a respective access module 60-i comprises a non-multiplexed signal input buffer 320, having a set of M, non-multiplexed signal-associated input ports 321-1, ..., 321-M that are coupled to M of the point-to-point loops of a respective external loop port 55-i. On its output side, the non-multiplexed signal input buffer 320 has a set of M output ports 322-1, ..., 322-M that are coupled to associated M input ports 311-5 of the input multiplexer 310. Input multiplexer 310 has a plurality of output ports 312-1–312-5, associated with respective ones of its input ports 311-1–311-5, coupled to corresponding input ports 321 of a signal processing circuit 330.

Signal processing circuit 330, which is preferably implemented as a digital signal processor (DSP), is programmably configurable by the system controller unit (SCU) 100 to execute protocol conversion functionality for effecting one of loop repeater and time division multiplex connectivity between selected ones of its input and output ports, that achieves a selected telecommunication connectivity, such as but not limited to ISDN, HDSL, ADSL, T1 office repeater, fractional T1, optical DS2, DSX-1, DDS, DAML, DAML POTS, etc., between the network and a subscriber circuit served by the network.

For this purpose, signal processing circuit 330 has a plurality of output ports 332, associated with respective ones of its input ports 331, coupled to corresponding input ports 341-1–341-5 of an output multiplexer 340 of input/output multiplexer 314. On the multiplexed signal side, output multiplexer 340 has first and second TDM output bus ports 342-1 and 342-2, that are respectively coupled to TDM bus ports 301-1 and 301-2 of the multiplexed signal input buffer 300. Similarly, third and fourth output bus ports 342-3 and 342-4 of output multiplexer 340 are respectively coupled to first and second point-to-point bus ports 301-3 and 301-4. On the non-multiplexed signal side, the output multiplexer 340 has a set of M, non-multiplexed output ports 342-5 coupled to respective ones of the set of M, non-multiplexed signal-associated input ports 321-1, ..., 321-M of the non-multiplexed signal input buffer 320.

The operation of the access module's input and output multiplexers 320 and 340 is established by way of an access module control processor 350, having an input bus 351 coupled to the control bus from the system controller unit (SCU) 100, through which backplane connectivity configuration parameters are programmed into the DSP of the line circuit access module. Access module control processor 350 has an input multiplexer control link 352 coupled to the input multiplexer 320 and an output multiplexer control link 354 coupled to the output multiplexer 340. Control processor 350 has a further control link 353 coupled to the telecommunication connectivity signal processing circuit 330, through which the intended protocol conversion functionality (for either loop repeater or time division multiplex mode) is programmed into the access module 60-i from the SCU 100.

Thus, by a combination of programmed multiplexer connectivity through the signal transport paths of input multiplexer 310 and output multiplexer 340 and the protocol conversion performed by processor 330, each individual line circuit access module is programmably configurable to provide a selected mode (multiplexed mode or loop repeater mode) of telecommunication connectivity between the network and a subscriber circuit served by the network. Through system controller unit 100, network service personnel can readily program backplane connectivity configuration parameters into the respective pairs of network multiplexers 30 and each of the line circuit access modules 60, and thereby enable any line access module to provide either multiplexed or loop repeater mode telecommunication connectivity between the network and each subscriber circuit.

Non-limiting examples of loop repeater and multiplexed mode circuit configurations of the backplane architecture of the invention described above and shown in FIGS. 1–3 are illustrated in the data flow and connectivity diagrams of FIGS. 4–11, which replicate FIGS. 1–3, as appropriate, in the signal propagation paths of the examples are shown in bold lines. FIG. 12 shows data flow paths through the backplane for the examples of FIGS. 4–11 operating simultaneously.

Figure 4:
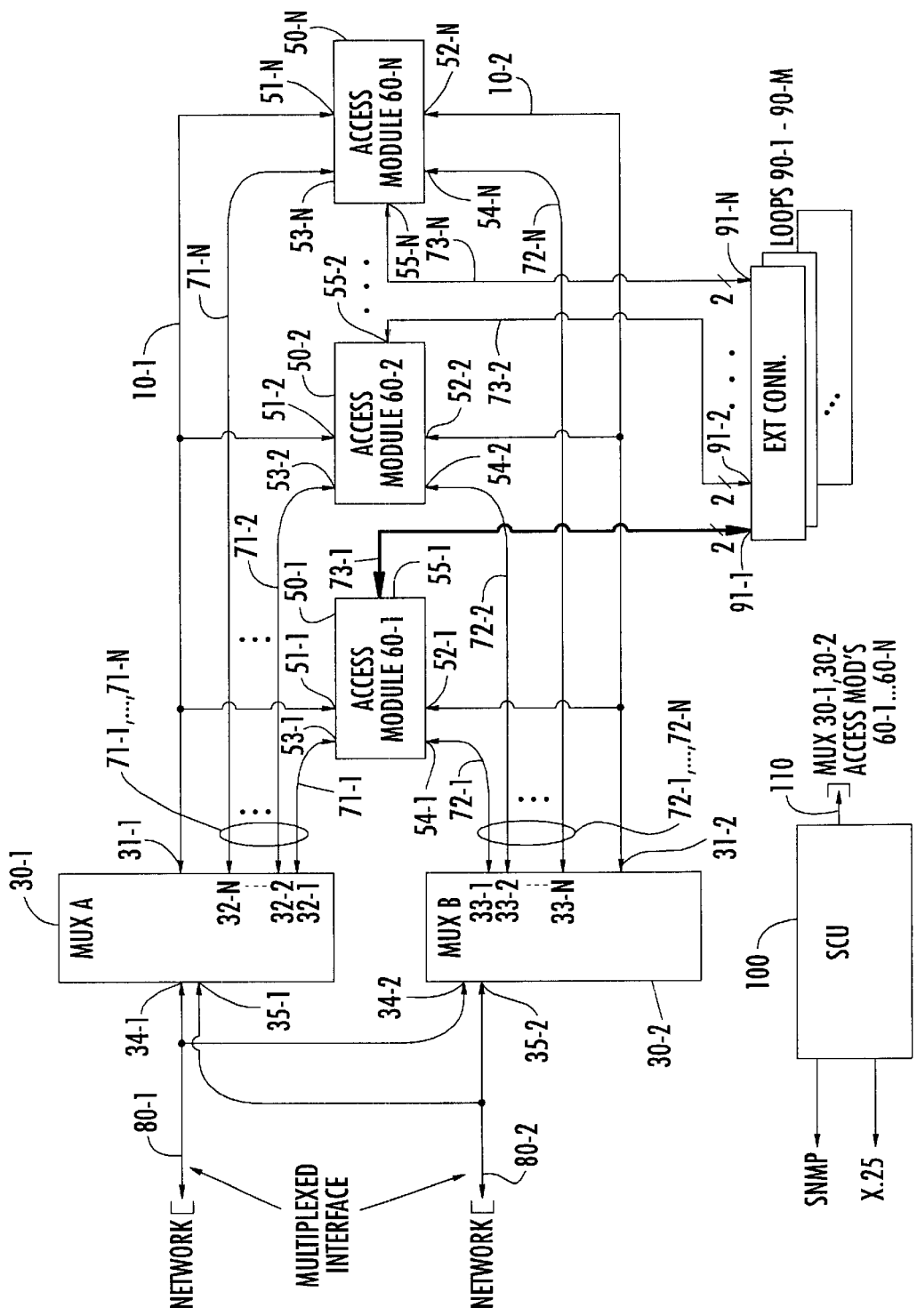
FIGS. 4 and 5 show the diagrams of FIGS. 1 and 3, respectively, containing signal paths in bold in association with non-multiplexed mode of operation of the backplane architecture of the invention.
Figure 5:
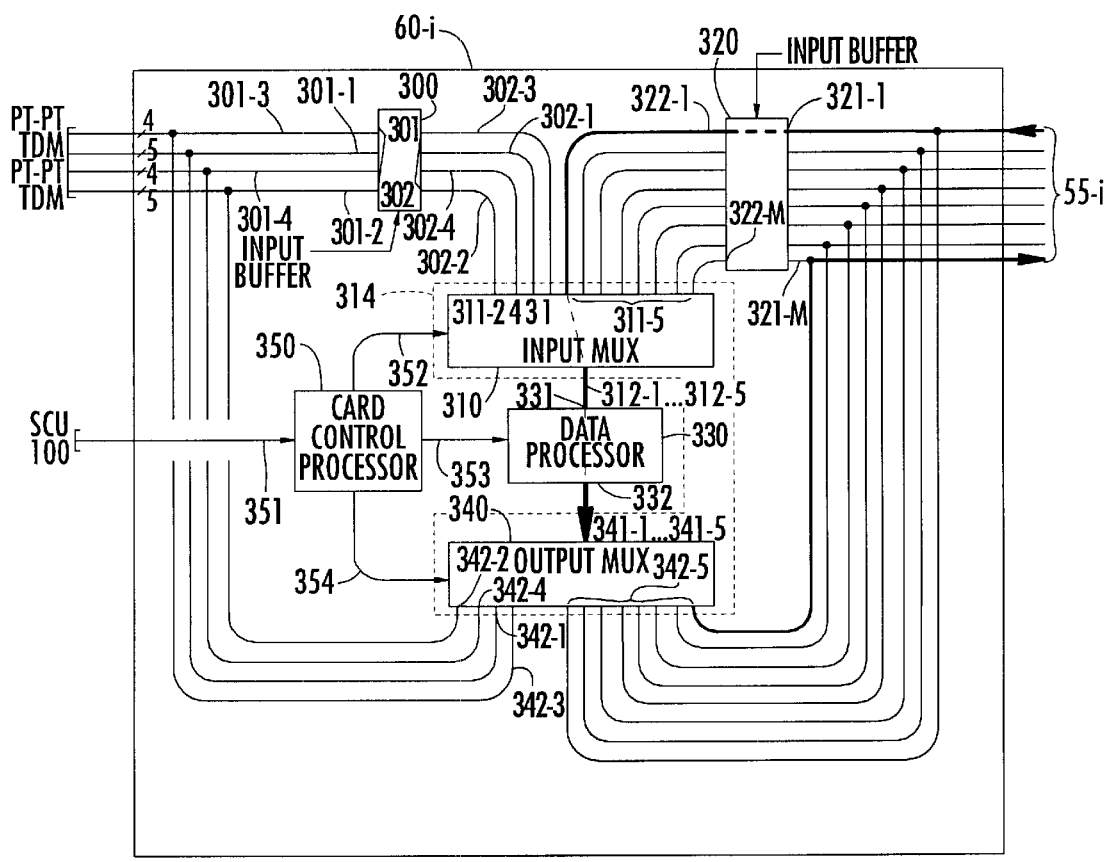

1—Access Module in Non-multiplexwd Mode (FIGS. 4–5)

In this first example, where a point-to-point data connection from the network is supplied to access module 50-1, the data path is provided by way of point-to-point (loop-associated) communication link 73-1 from interface connector 90-1, as shown in bold in FIG. 4. The data connectivity path through access module 50-1 is diagrammatically shown in the bold path of FIG. 5 as comprising a point-to-point loop 55—non-multiplexed non-multiplexed signal input buffer 320—input multiplexer 310—signal processing circuit 330—output multiplexer 340—point-to-point loop 55. Since there is no multiplexing of the data through network interface multiplexer 30, a path through FIG. 2 is not shown.

Figure 6:
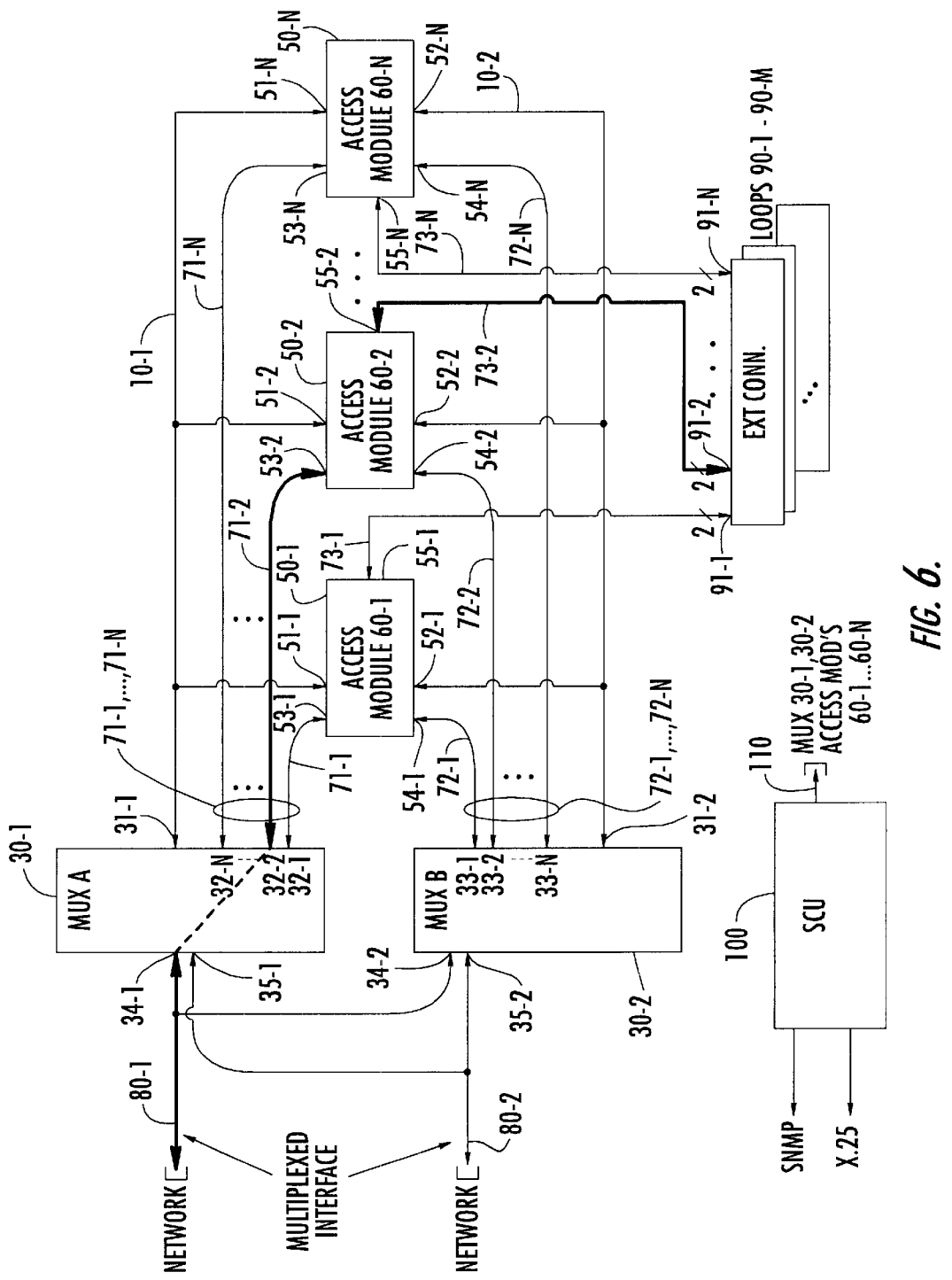
FIGS. 6–8 show the diagrams of FIGS. 1–3, respectively, containing signal paths in bold in association with TDM multiplexed mode.
Figure 7:
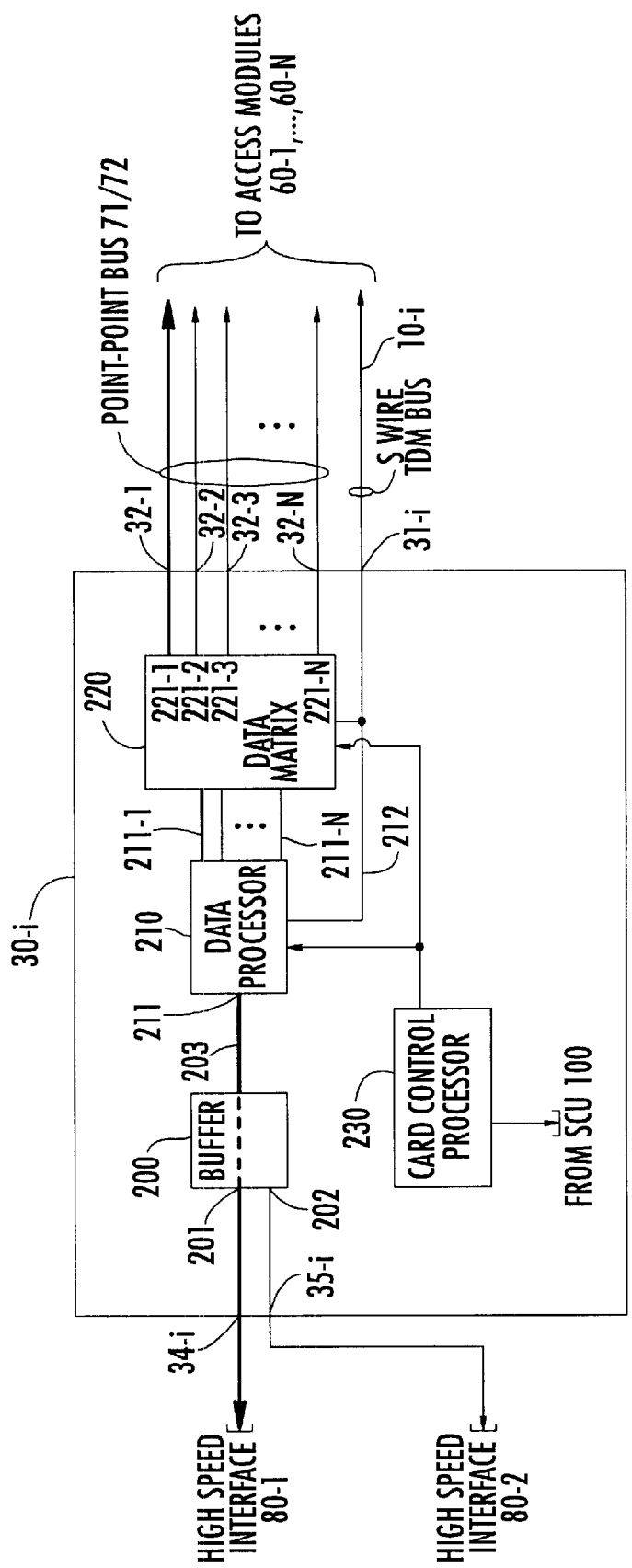
Figure 8:
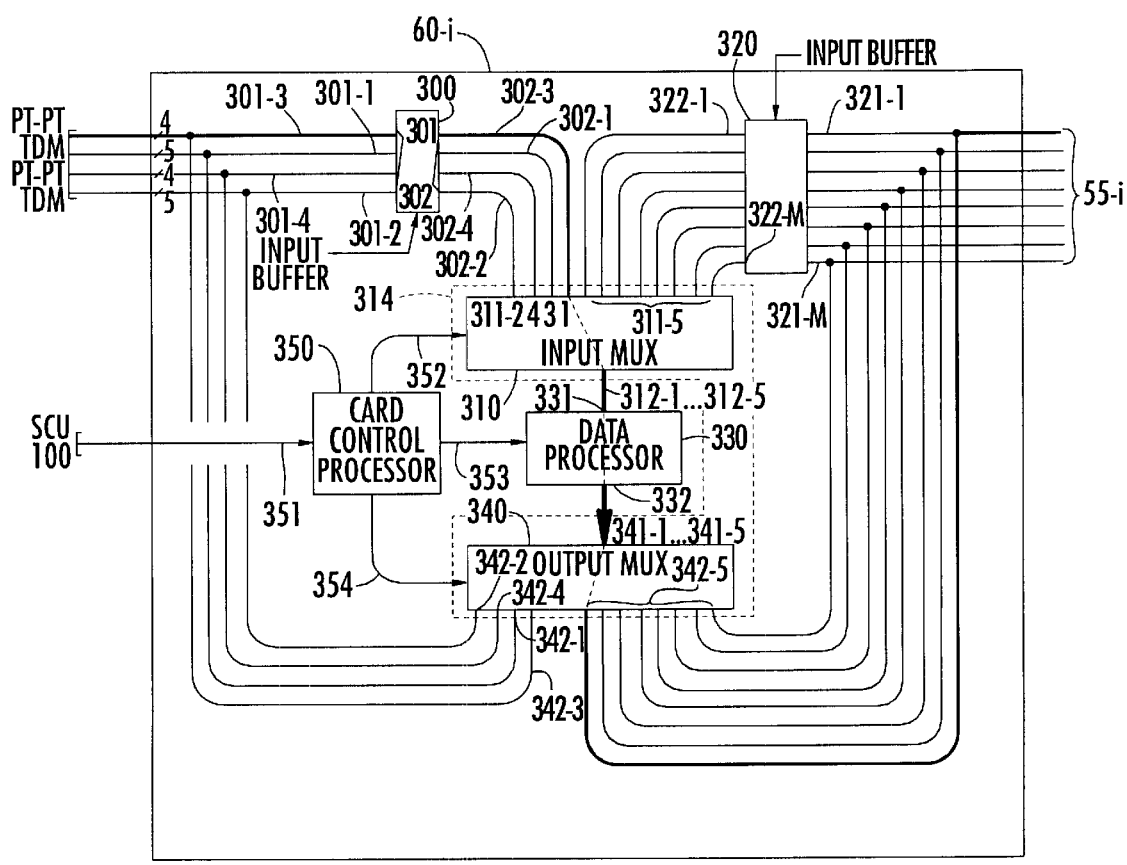

2—Access Module in TDM Multiplexwd Mode (FIGS. 6–8)

In this second example, a high speed TDM format data path is provided from the network to access module 50-2. For this purpose, as shown in bold in FIG. 6, the TDM multiplexed data path includes high speed multiplexed network communication link 80-1—network interface multiplexer 30-1—point-to-point communication link 71-2—access module 50-2—point-to-point (loop-associated) communication link 73-2—and interface connector 90-2.

The data path through network interface multiplexer 30-1 is shown in bold in FIG. 7 as including high speed multiplexed network communication link 80-1—data buffer 200—data processor 210—data matrix 220—point-to-point multiconductor communication link 71-2 to access module 50-2. The data path through access module 50-2 is diagrammatically shown in the bold path of FIG. 8 as comprising point-to-point bus port 301-3 (to which link 71-2 is connected)—multiplexed signal input buffer 300—input multiplexer 310—signal processing circuit 330—output multiplexer 340—point-to-point loop 55.

Figure 9:
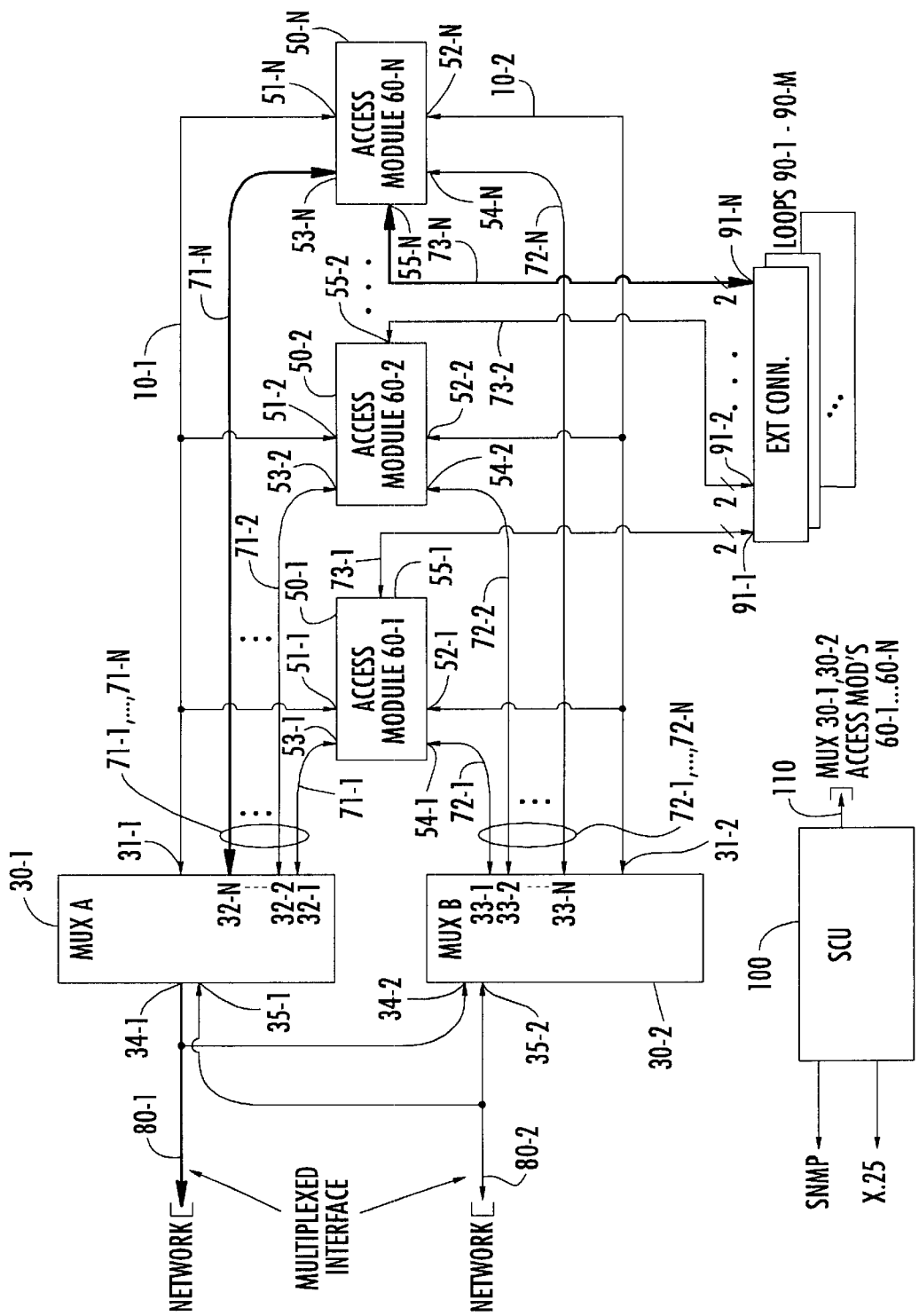
FIGS. 9–11 show the diagrams of FIGS. 1–3, respectively, containing signal paths in solid and broken bold lines in association with respective TDM and non-multiplexed modes.
Figure 10:
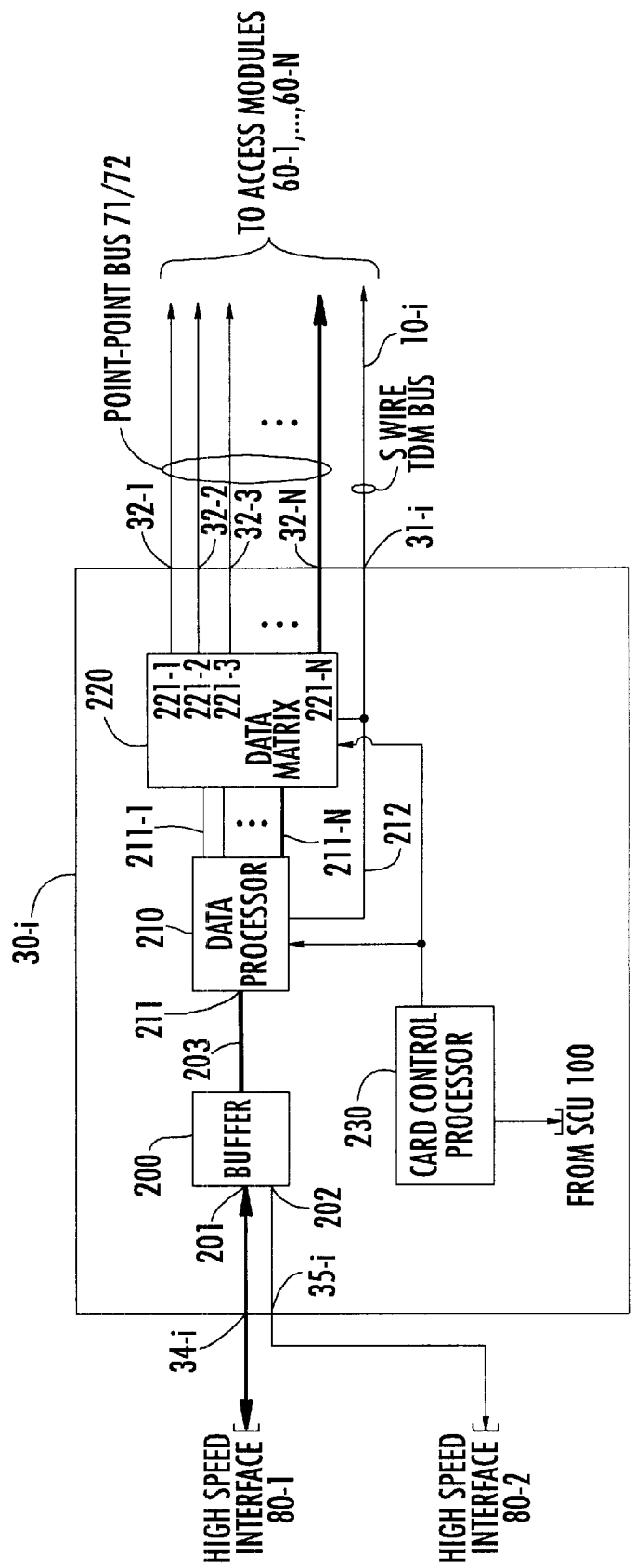
Figure 11:
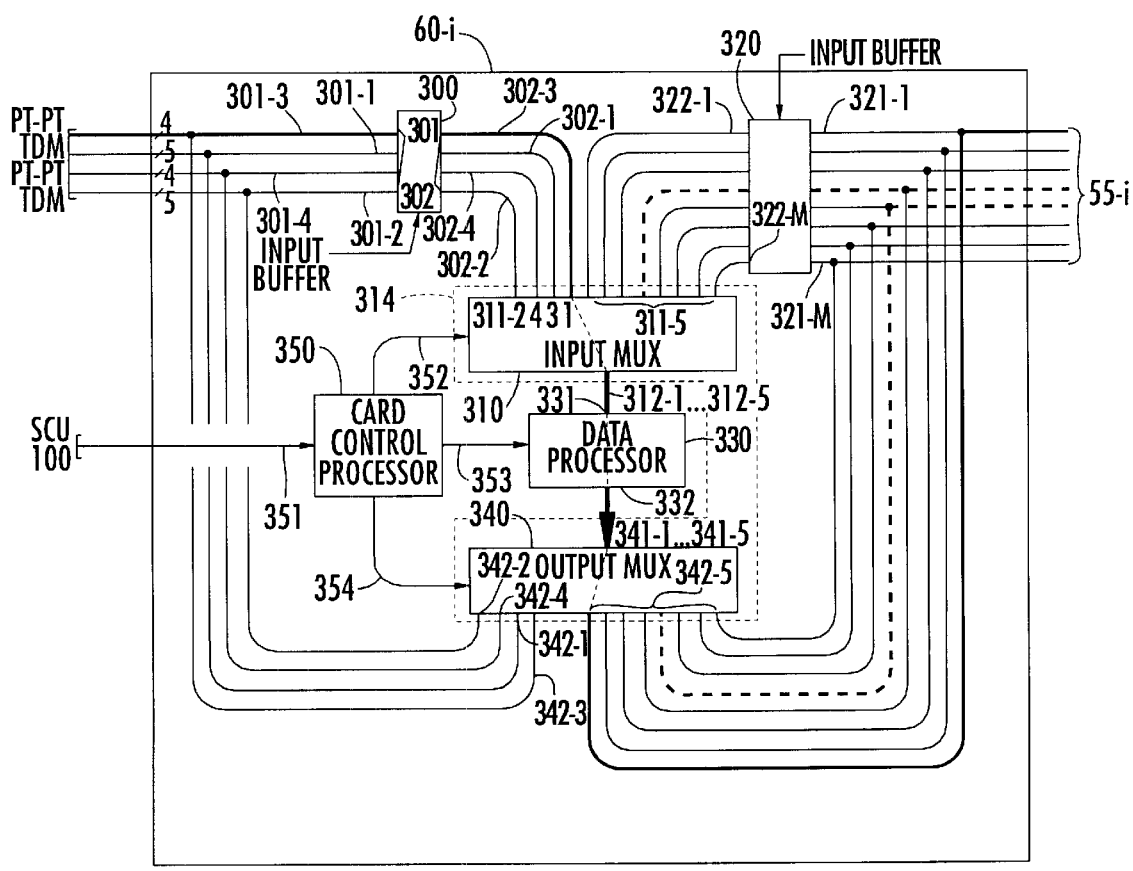
Figure 12:
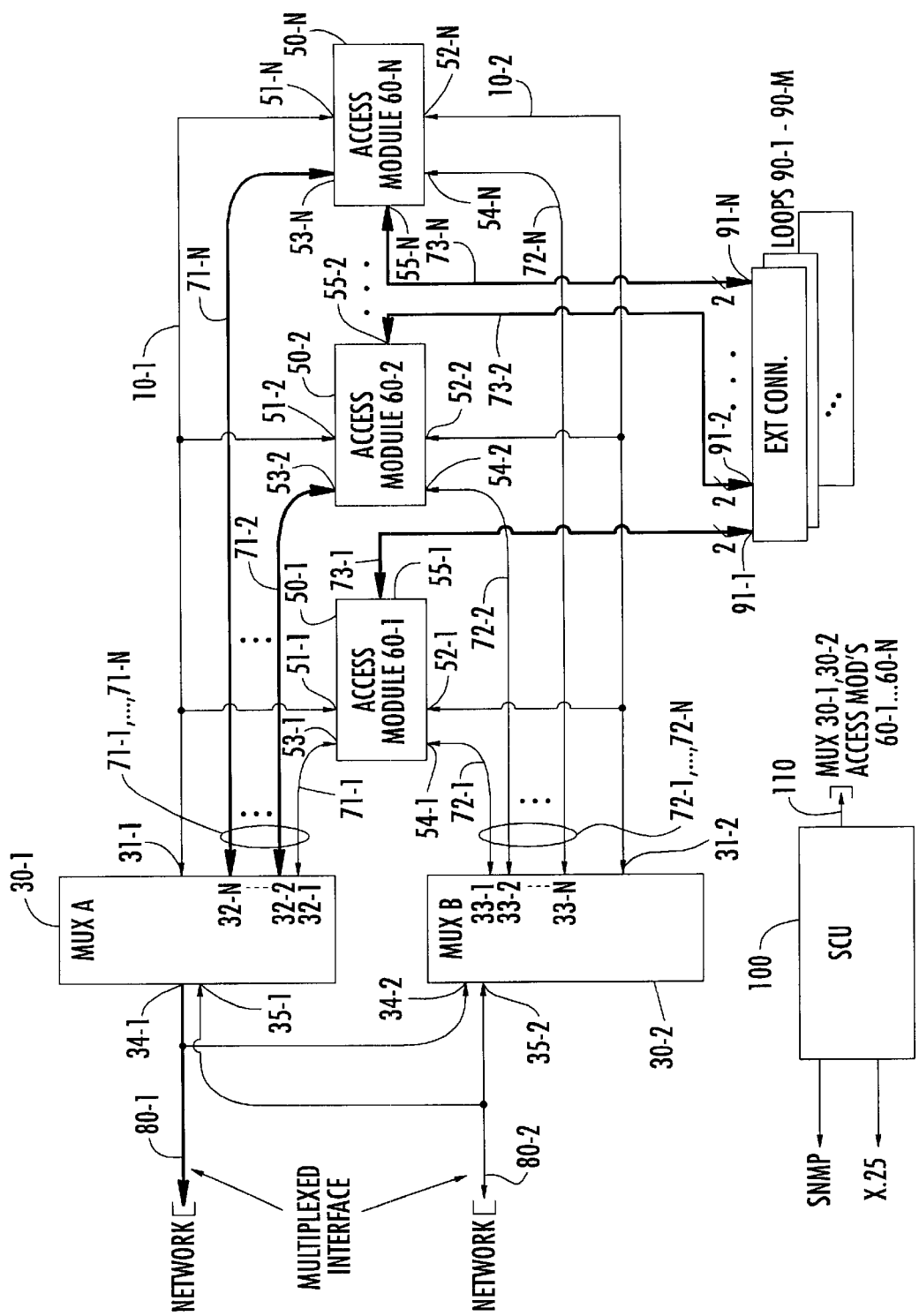
FIG. 12 shows data flow paths through the backplane architecture of FIGS. 1–3 for each of the examples of FIGS. 4–11 operating simultaneously.

3—Non-Multiplexed and TDM Mode (FIGS. 9–11)

In this third example, a high speed TDM format data path and non-multiplexed paths are provided from the network to access module 50-N. For this purpose, as shown in bold in FIG. 6, the TDM multiplexed data path includes high speed multiplexed network communication link 80-1—network interface multiplexer 30-1—point-to-point communication link 71-N—access module 50-N—point-to-point (loop-associated) communication link 73-N—and interface connector 90-N.

The data path through network interface multiplexer 30-1 is shown in bold in FIG. 10 as including high speed multiplexed network communication link 80-1—data buffer 200—data processor 210—data matrix 220—point-to-point multiconductor communication link 71-N to access module 5-N. The data paths through access module 50-N are diagrammatically shown in bold solid and broken lines in FIG. 11. A first of these paths shown in bold solid lines comprises point-to-point bus port 301-3 (to which link 71-N is connected)—multiplexed signal input buffer 300—input multiplexer 310—signal processing circuit 330—output multiplexer 340—point-to-point loop 55. The second path shown in bold broken lines comprises point-to-point loop 55—non-multiplexed non-multiplexed signal input buffer 320—input multiplexer 310—signal processing circuit 330—output multiplexer 340—point-to-point loop 55.

As will be appreciated from the foregoing description, the hardware complexity and cost associated with the conventional use of different line card shelf installations for multiplexed and loop repeater mode line cards is effectively obviated by the multi-mode backplane architecture of the present invention, which is configured to simultaneously provide connectivity for both multiplexed communication circuits and non-multiplexed (loop repeater) circuits in the same equipment shelf.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. A backplane architecture for interfacing diverse types of communication links of a telecommunication network with subscriber circuits served by said network, said backplane architecture comprising:

a network interface multiplexer that is configured to provide time division multiplexed signal connectivity and point-to-point multiplexed signal connectivity between said network and line circuit access modules to which said subscriber circuits may be selectively ported;

a plurality of non-multiplexed interface connectors, each of which is configured for external connection to non-multiplexed communication links of said network and non-multiplexed communication links of said subscriber circuits, and having a plurality of point-to-point communication ports; and a plurality of access module card slots, each of which is configured to receive a line circuit access module that is programmable to provide a selected one of a plurality of diverse modes of telecommunication connectivity between the network and a subscriber circuit served by the network, a respective line circuit access module having an input/output multiplexer arrangement that is operative to selectively provide connectivity between said line circuit access module and signal paths of said network interface multiplexer, and signal paths of said plurality of point-to-point communication ports.

2. A backplane architecture according to claim 1, wherein said input/output multiplexer arrangement comprises a processor controlled input/output multiplexer arrangement, that is buffered between said network interface multiplexer and communication ports of said plurality of non-multiplexed interface connectors, and a digital signal processor that is programmably configurable to execute protocol conversion functionality for providing said selected one of said plurality of diverse modes of telecommunication connectivity.

3. A backplane architecture according to claim 2, wherein said digital signal processor is programmably configurable to execute protocol conversion functionality for providing a selected one of multiplexed and loop mode signalling between said network and said subscriber circuits.

4. A backplane architecture according to claim 1, wherein said network interface multiplexer includes a multiplexed network port connected to a multiplexed communication link of said network, a time division multiplexed bus port connected by way of a time division multiplexed communication bus to said plurality of access module card slots, and a plurality of further ports connected by way of point-to-point communication links to respective ones of said plurality of access module card slots.

5. A backplane architecture according to claim 4, wherein said input/output multiplexer arrangement of said line circuit access module comprises a processor controlled input/output multiplexer arrangement, that is buffered between said network interface multiplexer and communication ports of said plurality of non-multiplexed interface connectors, and a digital signal processor that is programmably configurable to execute protocol conversion functionality for providing said selected one of said plurality of diverse modes of telecommunication connectivity, and wherein said digital signal processor of said line circuit access module is programmably configurable to execute protocol conversion functionality for providing a selected one of multiplexed and loop mode signalling between said network and said subscriber circuits.

6. A backplane architecture according to claim 4, wherein said multiplexed communication link of said network comprises a time division multiplexed communication link transporting one of DSX, STS, and OC-X communication signals.

7. A backplane architecture for interfacing diverse types of communication links of a telecommunication network with associated signal processing circuits that are operative to provide telecommunication connectivity between said network and subscriber circuits served by said network, said backplane architecture comprising:

a multiplexed communication bus;

a first plurality of point-to-point communication links; a second plurality of point-to-point communication links;

a plurality of non-multiplexed interfaces, each of which includes a plurality of non-multiplexed ports coupled to said first plurality of point-to-point communication links, and being configured for connection to non-multiplexed communication links of said network and non-multiplexed communication links of said subscriber circuits;

a network interface multiplexer, having a multiplexed network port configured for connection to a multiplexed communication link of said network, a multiplexed bus port configured for connection to said multiplexed communication bus, and a plurality of further ports configured for connection to said second plurality of point-to-point communication links; and a plurality of line circuit modules, a respective line circuit module containing a signal processing circuit that is configurable to provide telecommunication connectivity between said network and a subscriber circuit served by said network, and including a multiplexed bus port configured for connection to said multiplexed communication bus, a first port configured for connection to one of said second plurality of point-to-point communication links, a plurality of second ports configured for connection to said first plurality of point-to-point communication links, and an input/output multiplexer which is coupled to and is controllably operative to selectively provide connectivity between said signal processing circuitry and said multiplexed bus port, said first port, and said plurality of second ports.

8. A backplane architecture according to claim 7, wherein said signal processing circuit comprises a programmable data processor that is operative to provide a selected type of telecommunication connectivity between said network and a subscriber circuit served by said network.

9. A backplane architecture according to claim 7, wherein said input/output multiplexer includes:

an input multiplexer having a plurality of inputs coupled to said multiplexed bus port, said first port, and said plurality of second ports, and a plurality of outputs coupled to said signal processing circuit, and an output multiplexer having a plurality of inputs coupled to said signal processing circuit, and a plurality of outputs coupled to said multiplexed bus port, said first port, and said plurality of second ports.

10. A backplane architecture according to claim 9, wherein said signal processing circuit comprises a programmable data processor that is programmably configurable to provide a selected type of telecommunication connectivity between said network and a subscriber circuit served by said network.

11. A backplane architecture according to claim 10, wherein said signal processing circuit comprises a programmable data processor that is programmably configurable to provide a selected one of loop repeater or time division multiplex telecommunication connectivity between said network and a subscriber circuit served by said network.

12. A backplane architecture according to claim 7, wherein said signal processing circuit comprises a programmable data processor that is programmably configurable to provide digital data signal connectivity between said network and subscriber digital terminal equipment ported over a local loop to a non-multiplexed interface.

13. A backplane architecture according to claim 7, wherein said signal processing circuit comprises a programmable data processor that is programmably configurable to provide signalling protocol conversion between said network and subscriber digital terminal equipment ported over a local loop to a non-multiplexed interface.

14. A backplane architecture according to claim 7, wherein said non-multiplexed communication links of said network and non-multiplexed communication links of said subscriber circuits comprise loop circuits.

15. A backplane architecture according to claim 7, wherein said multiplexed communication link of said network comprises a time division multiplexed communication link transporting one of DSX, STS, and oc-x communication signals.

* * * * *